United States Patent [19]
Osborne

[11] Patent Number: 4,795,173
[45] Date of Patent: Jan. 3, 1989

[54] DOUBLE O-RING SEALING ARRANGEMENT

[76] Inventor: Lyle E. Osborne, 1506 Stanmore Ct., South Bend, Ind. 46614

[21] Appl. No.: 181,059

[22] Filed: Apr. 13, 1988

[51] Int. Cl.$^4$ ............................ B61F 15/22; F16J 9/00
[52] U.S. Cl. ................................ 277/168; 277/171; 277/177
[58] Field of Search ............... 277/123, 177, 173, 174, 277/175, 176, 103, 73, 124, 125, 116.2, 3, 168, 169, 170, 171, 172, 188 R, 188 A; 92/89, 90, 157, 159, 182, 80, 82, 86, 165 R, 168

[56] References Cited

U.S. PATENT DOCUMENTS

| | | | |
|---|---|---|---|
| 2,314,683 | 3/1943 | Berry | 277/177 |
| 2,593,193 | 4/1952 | Rockwell | 277/177 |
| 2,614,793 | 10/1952 | Storm | 277/177 |
| 2,705,177 | 3/1955 | Waring | 277/176 |
| 3,094,043 | 6/1963 | Powers et al. | 277/130 |
| 3,184,247 | 5/1965 | Leutwyler | 277/177 |
| 3,230,977 | 1/1966 | Mercier | 138/31 |
| 4,544,049 | 10/1985 | Shellhause | 277/177 |
| 4,564,202 | 1/1986 | Momose | 277/3 |
| 4,577,870 | 3/1986 | Scott et al. | 277/1 |
| 4,651,782 | 3/1987 | Fulmer | 138/31 |
| 4,691,520 | 9/1987 | Osborne | 60/593 |
| 4,693,276 | 9/1987 | Fulmer | 138/31 |

Primary Examiner—William A. Cuchlinski, Jr.
Assistant Examiner—Petar Arsenovic
Attorney, Agent, or Firm—Barnes & Thornburg

[57] ABSTRACT

A double O-ring sealing arrangement for a pressure responsive device wherein a storage-buffer chamber is provided between the double O-rings and is kept at a high pressure even when the actuating pressure for the pressure responsive device is dropped below atmosphere so as to provide for an as effective sealing of an actuating chamber of the pressure responsive device from the surrounding atmosphere.

21 Claims, 2 Drawing Sheets

DOUBLE O-RING SEALING ARRANGEMENT

BACKGROUND AND SUMMARY OF THE INVENTION

The invention relates to a double O-ring sealing arrangement utilized to keep hydraulic fluid pressure operating on one side of a first O-ring from being contaminated by air operating against an opposing side of the second O-ring.

In piston arrangements used for braking systems, hydraulic fluid is utilized to act on the face of the piston to apply or release the brake in response to the pressure of the fluid applied. Normally, this pressure acts against the bias of springs in the brake control system. When the piston is to be activated to apply the brake, high pressure fluid is applied to an end face of the piston. When the brake is to be released, the pressure of the hydraulic fluid applied to the end face of the piston is considerably reduced, and if reduced below atmospheric pressure, air can leak past the fluid seals on the edges of the piston and contaminate the hydraulic brake fluid. Air in the brake fluid lines causes a loss of control of the brake due to tee fact that air is compressible, whereas the fluid is not. Thus, the brake pedal cannot apply the brake properly.

It is an object of this invention to provide a particular sealing arrangement which eliminates the leakage of air around the sealing arrangement, and thus avoids contamination of the hydraulic brake fluid. When air gets into the brake fluid, the brakes become relatively unusable due to the compressibility of the air.

The present invention utilizes a double O-ring sealing arrangement for a brake piston which prevents air from being introduced into the hydraulic system of the hydraulic pressure drops below atmospheric pressure. Under special conditions and in some brake systems, when hydraulic brakes are utilized, the hydraulic pressure will drop below atmospheric Pressure upon release of the brakes. Note my prior U.S. Pat. No. 4,691,520 of Sept. 8, 1987 entitled Hydraulic Brake System. At such time, atmospheric pressure surrounding the piston has a tendency to bypass and leak around the sealing arrangement and contaminate the hydraulic fluid.

Applicant has devised a double O-ring sealing arrangement which eliminates commingling of the air and the hydraulic fluid which activates the piston. The double O-ring sealing arrangement comprises two O-ring seals provided circumferentially about the piston and spaced from one another to provide a storage-buffer chamber therebetween.

This storage-buffer chamber receives high pressure hydraulic fluid when a high pressure hydraulic fluid is applied to the brake piston end face to apply the brakes. When the brakes are to be released, the high pressure hydraulic fluid applied to the end face may be reduced below atmospheric pressure. At the time this reduction in hydraulic fluid pressure at the end face of the piston takes place, the storage-buffer chamber is kept filled with high pressure fluid to thus Provide an effective sealing pressure force about the second O-ring. At this time the second 0-ring will have atmospheric air pressure on one side thereof and the storage-buffer chamber pressure on the other side thereof. Thus, there will be no tendency for the air at atmospheric pressure to leak past the O-ring into the reduced Pressure of the hydraulic fluid at the piston end face which is now at below atmospheric pressure, and thus contamination is avoided.

The double O-ring sealing arrangement comprises a first O-ring seal located longitudinally along the side of the skirt of of the piston and spaced from a second O-ring seal. The first O-ring seal sits in a V-shaped channel on the piston. The V-shaped channel runs radially around the piston and has a first outwardly sloping side ramp facing the end face of the piston and a second outwardly facing side ramp extending away from the end face of the piston. These two sloping faces define the V-shaped recess.

A passageway is located in the sloping face farthest from the end face of the piston. This passageway leads to the storage-buffer chamber which, at an end opposite the first O-ring, contains second O-ring. On the side of the second O-ring, not facing the storage-buffer chamber in the direction of the end face of the piston, is the normal clearance way connected to atmospheric air. When high pressure hydraulic fluid is applied to the end face of the piston, this pressure causes the first O-ring to deform and move away from the first outwardly facing ramp. As the first O-ring deforms, O-ring contact with the first ramp is lost, so that high pressure fluid leaks around the first O-ring through the passage into the storage-buffer chamber. When the pressure in the storage-buffer chamber equals the pressure of the hydraulic fluid operating on the end face of the piston, the first O-ring will move back into contact with the first ramp and trap fluid in the storage-buffer chamber. The reason for the first O-ring moving back to its original position, is that the pressures on both sides of the O-ring are equal, thus producing no net force thereon and the normal tendency for a rubber O-ring is to be deformed by pressure and to resume its normal O-ring configuration when unequal pressures are no longer being applied. Thus, as the hydraulic pressure is subsequently lowered at the end face of the piston with the concurrent movement of the first O-ring to close off the passageway, the storage-buffer chamber maintains the high pressure therein, which high pressure acts on one side of the second O-ring to prevent air from leaking into the hydraulic fluid. This is true because the pressure then in the storage-buffer chamber is high compared to the atmospheric pressure of the air surrounding the brake piston.

As the pressure in the storage-buffer chamber is high compared to the atmospheric pressure of the air on the other side of the second O-ring, some leakage of the hydraulic fluid past either O-ring may occur. Accordingly, the storage-buffer chamber is made flexible, so that there will be sufficient hydraulic fluid therein to maintain pressure, regardless of the small leakages that might take place past either O-ring.

One method of increasing the volume of the storage-buffer chamber is by connecting the storage-buffer chamber with an auxiliary storage chamber having a deformable wall or walls. This auxiliary storage chamber can be a hollowed out area in a portion of the piston itself.

When high pressure hydraulic fluid is applied to the end face of the piston, leakage of this high pressure fluid around the sides of the piston to cause the first O-ring to move is inherent. Additionally, the end face of the piston can be configured such that when the high pressure hydraulic fluid is applied to the end face of the piston, a portion of the piston deforms to increase the amount of leakage of high pressure hydraulic fluid into the buffer chamber. This deformation is essentially longitudinal and not axially.

The above double O-ring sealing arrangement can be utilized on pistons in brake systems where the skirt of the piston itself actuates the pressure plate of the brake.

In systems wherein there is an intermediate member between the piston and the pressure plate, a different part of the piston deflects under pressure to provide increased buffer chamber volume.

This double O-ring sealing arrangement provides the necessary sealing environment for this type of structure.

It is thus seen that the invention provides a double O-ring sealing arrangement wherein a storage-buffer chamber is interposed between two O-ring seals so that air pressure on one side of one seal is not allowed to contaminate the hydraulic fluid on the other side of the other seal when the hydraulic fluid is reduced to below atmospheric pressure.

These and other objects, features and advantages of the present invention will become apparent from the following description when taken in connection with the accompanying drawings which show, for the purposes of illustration only, plural embodiments in accordance with the present invention, and wherein:

DETAILED DESCRIPTION OF THE DRAWINGS

Figure 1:
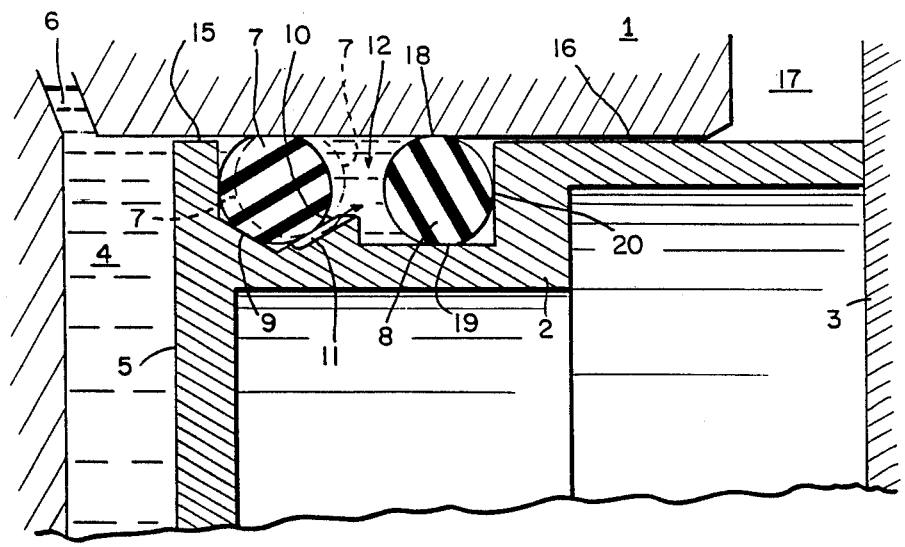
FIG. 1 is a schematic illustration in cross-section showing the plural O-ring sealing arrangement.

Referring now to the drawings wherein like reference numerals are used to designate like parts, and more particularly to FIG. 1, there is shown a piston cylinder brake housing in cross-section wherein a cylinder housing 1 has a piston 2 located in sealing arrangement therein.

The skirt of piston 2 operates against a pressure plate 3 of a brake mechanism in response to the pressure of hydraulic fluid in chamber 4 acting on the end face 5 of the piston. Hydraulic brake fluid is directed into chamber 4 via passageway 6 leading from a source of brake fluid. This brake fluid has its pressure controlled in the normal manner, such that for actuation of the brake via the pressure plate 3, high pressure fluid comes from the source through the passageway 6 into the chamber 4 to act against the end face 5 of the piston 2 to move the piston 2 and thus the pressure plate 3 into brake engaging position.

When it is desired to release the brake, the pressure of the hydraulic fluid in chamber 4 is vented from the chamber 4 via the passageway 6 to a hydraulic pressure sump in the brake hydraulic fluid system in the conventional manner (not shown).

A V-shaped supporting channel is provided for a first O-ring 7 circumferentially around the piston and includes a first inclined ramp 9 leading towards the piston end face 5. A second inclined ramp 10 leads away from the end wall 5 of the piston and includes therein a passageway 11 so that the second ramp 10 merely serves to hold the O-ring in contact with the first ramp 9. A storage-buffer area 12 is located between the first O-ring 7 and a second O-ring 8.

Adjacent the right-hand side of the second O-ring 8 is a clearance area 16 leading to atmosphere at 17. The clearance 16 is preferably the normal clearance found in a piston cylinder between the cylinder 1 and the piston 2. Adjacent the end face 5 of the piston 2 is a second clearance way 15 between the end face of the piston and the cylinder 1. This clearance is but a continuation of the normal aforementioned clearance 16.

Upon application of high Pressure from the source through the inlet 6 to the chamber 4, hydraulic fluid will leak around the clearance area 15 and apply a force against the left hand side of the first O-ring 7. This force will cause the first O-ring 7 to distort and move away from the first inclined ramp 9 and thus allow high pressure hydraulic fluid from chamber 4 to pass through the clearance 15 around the left-hand side of the first O-ring 7 through the passageway 11 into the storage-buffer area 12. Prior to the high pressure being applied into chamber 4, the first O-ring 7 provides the normal seal between the ramp 9 and the cylinder wall 1.

Upon high pressure being applied to the storage-buffer 12, the second O-ring 8 will be forced to the right-hand side of the storage-buffer chamber 12. The second ring 8 is always in sealing contact between the piston 2 and the cylinder 1 at sealing edges 18 and 19. When the storage-buffer chamber 12 is filled with high pressure fluid, the second O-ring moves all the way to the right to also provide sealing at piston edge 20. During this high pressure filling of the storage-buffer chamber 12, a high pressure force of hydraulic fluid is applied to the left-hand side of the second O-ring 8 in opposition to the atmospheric air at 17 which is applied to the right hand side of the second O-ring 8 via the clearance area 16. Thus, no air can leak in around the second O-ring, since it is in contact with a high pressure, the hydraulic fluid pressure in the storage-buffer chamber 12 which is greater than that of atmospheric air.

When the pressure in the storage-buffer chamber is the same as the pressure being applied to the left-hand side of the first O-ring 7, the first O-ring 7 will return to its normal O-ring configuration and seat against ramp 9, thus sealing the storage-buffer chamber 12 with the then high pressure hydraulic fluid. The reason for the first O-ring 7 to resume its original position is that the pressures acting in the storage-buffer chamber 12 are the same as the pressure operating through the leakage path 15, coming from the high Pressure source via the passageway 6 and the chamber 4. There is a natural tendency for the first O-ring 7 to assume its normal shape and thus undistort and become once again of circular configuration applying a seal against both V-shaped side wall ramps 9 and 10.

When it is desired to release the brake, the pressure in chamber 4 may be vented to below atmospheric and the hydraulic fluid released from the chamber 4 via the passageway 6 to the sump. When this happens, the storage-buffer chamber retains its high pressure fluid and the atmospheric air at 17 is still denied entry into the chamber 12 by virtue of the fact that chamber 12 is at a higher pressure than the atmospheric air. This effective seal will last as long as there is sufficient hydraulic fluid in the storage-buffer chamber 12 to take care of any leakage of hydraulic fluid that may occur around either O-ring.

Likewise, since the hydraulic pressure at 4 is now below atmospheric, some minor leakage of hydraulic pressure may also occur from the storage-buffer chamber back into the chamber 4 around the first O-ring 7. This leakage is at most a nominal, minimal amount. Thus, the storage-buffer chamber 12 acts as a deterrent for passage of atmospheric air from 17 into the hydraulic fluid at 4.

Figure 2:
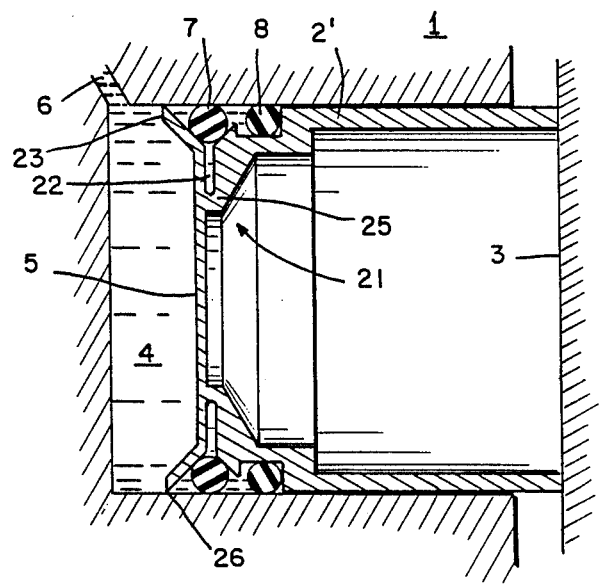
FIG. 2 is a schematic showing of the arrangement of FIG. 1 used in a brake cylinder wherein the piston skirt directly operates a pressure Plate of the brake.

FIG. 2 shows a similar arrangement of parts as is shown in FIG. 1, wherein the piston 2' has its piston skirt directly activating the brake pressure plate 3. In this figure, there is a auxiliary storage chamber 22 located inside the piston adjacent end face 5 which holds high additional pressure hydraulic fluid and which is connected to the storage-buffer chamber 12 via the passageway 11 shown in detail in FIG. 1. The end face of the piston besides including the auxiliary chamber 22 also has a central bottom thickened portion 25. When high pressure fluid is applied to chamber 4, the forces against the center portion of the end face 5 of the piston 2' cause the portion 23 of the piston outside of portion 25 to move to the left relative to the rest of the piston 1 because of a flexture due to the inward movement of a central portion of the piston end face and a consequent flexture of the outer edge about the central bottom thickened portion 25. This increases the volume of fluid which enters, and is trapped in the storage-buffer chamber 12 and the auxiliary storage chamber 22.

Figure 3:
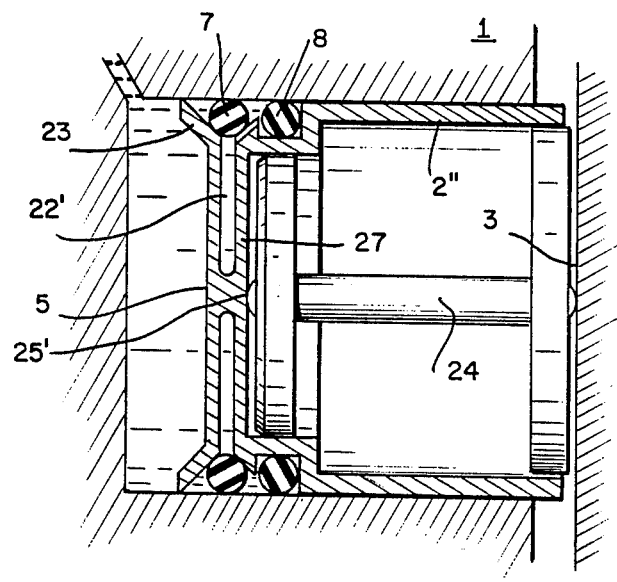
FIG. 3 is a schematic showing of the double O-ring sealing arrangement used where the piston operates the pressure plate of the brake through an intermediate member.

FIG. 3 shows a piston operating a pressure plate 3 of a brake system via an intermediate member 24 rather than through the skirt ends of the piston 2 itself. The piston end face applies a force at its center line which operates to move the intermediate member 24 which in turn contacts the pressure plate 3. Under this type of operation, force is applied along the center line of the piston, regardless of any out-of-parallel condition between the piston skirt 2" and the pressure plate 3. In this figure chamber volume is increases as pressure increases due to flexing of wall 27 around its contact point at 25' with member 24.

In both FIG. 2 and FIG. 3 the flexure of piston elements as pressure increases causes the two sides 9 and 11 of the V groove to move away from each other. This causes reduced compression of the O-ring 7 against the piston wall and the deisgn should be such that the O-ring will be restrained between the three surfaces when the trapped pressure in the storage buffer chamber and auxiliary chamber is significantly higher than atmospheric and pressure in the chamber 4 has been reduced to zero.

Thus it can be seen, that a double O-ring sealing arrangement is provided wherein a storage-buffer chamber 12 is provided between two O-rings 7 and 8 to keep leakage of atmospheric air from contaminating the hydraulic fluid used in a brake system.

While I have shown and described two embodiments in accordance with the present invention, it is understood that the same is not limited thereto, but is susceptible to numerous changes and modifications as known to one having ordinary skill in the art, and I therefore do not wish to be limited to the detail shown and described herein, but intend to cover all such modifications as are encompassed by the scope of the appeal claims. In that regard it should be noted that while the sealing arrangement of the instant disclosure is shown being applied to a piston cylinder of a brake assembly, the dual O-ring sealing arrangement could be used on any piston cylinder operation, or on any sealing arrangement which requires fluid pressure to be applied to member to move that member in a cylinder. Accordingly, it is specifically noted that the claims herein presented are not limited to the particular use of a piston cylinder brake system. Rather, there are claims presented which will cover a fluid pressure responsive member being moved in a chamber.

I claim:

1. A plural seal arrangement for a pressure actuated means moveable in a housing, wherein:
   said pressure actuated means comprises a pressure responsive member having a pressure responsive face against which is applied a fluid pressure, alternately having at least a high pressure mode and a low pressure mode; said pressure responsive member being moveable in said housing;
   plural seal means, each located between said pressure responsive member and said housing;
   a fluid pressure chamber means containing said pressure responsive face;
   a storage-buffer chamber means connected between said plural seal means;
   a first of said plural seal means being located closer to said pressure face than a second of said plural seal means which is spaced away from said pressure face and said first seal means;
   said first seal means being responsive to said high pressure mode for causing a passageway leading from said fluid pressure chamber to said storage-buffer chamber means to allow high pressure from said fluid pressure chamber means to flow into said storage-buffer chamber means and in response to said low pressure mode to cause said passageway to prohibit flow between the storage-buffer chamber means and said fluid pressure chamber; and
   wherein high pressure in said storage-buffer chamber means assists said second seal means in preventing pressure outside of said second seal means from entering into said storage-buffer chamber means.

2. The plural seal arrangement of claim 1, wherein the one seal means is an O-ring deformable seal.

3. The plural seal arrangement of claim 2, wherein both seal means are O-ring seals.

4. The plural seal arrangement of claim 2, wherein the said one seal means is seated on an inclined channel having the passageway therein.

5. The plural seal arrangement of claim 4, wherein the inclined channel is a V-shaped channel defined by two inclined ramps acutely angled to each other and the passageway is located in one of inclined ramps located further away from the said pressure responsive face than the other ramp.

6. The plural seal arrangement of claim 2, wherein there is an auxiliary storage chamber means adjacent to said pressure face and fluidly connected to the storage-buffer chamber means.

7. The plural seal arrangement of claim 6, wherein the auxiliary chamber is defined by a plurality of walls and wherein the area of the auxiliary chamber means is increased by deformation of at least one of said walls.

8. The plural seal arrangement of claim 2, wherein the pressure responsive face is deformable at the high pressure mode to aid in high pressure fluid being delivered to the said passageway.

9. The plural seal arrangement of claim 1, wherein both seal means are O-ring seals.

10. The plural seal arrangement of claim 1, wherein the said one seal means is seated on an inclined channel having the passageway therein.

11. The plural seal arrangement of claim 10, wherein the inclined channel is a V-shaped channel defined by two inclined ramps acutely angled to each other and the passageway is located in one of inclined ramps located further away from the said pressure responsive face than the other ramp.

12. The plural seal arrangement of claim 1, wherein there is an auxiliary storage chamber means adjacent to said pressure face and fluidly connected to the storage-buffer chamber means.

13. The plural seal arrangement of claim 12, wherein the auxiliary chamber is defined by a plurality of walls and wherein the area of the auxiliary chamber means is increased by deformation of at least one of said walls.

14. The plural seal arrangement of claim 1, wherein the pressure responsive face is deformable at the high pressure mode to aid in high pressure fluid being delivered to the said passageway.

15. A plural seal arrangement comprising:
first and second seal means spaced apart from one another to define a storage chamber therebetween, fluid in said storage chamber means and adjacent the first seal means outside of the storage chamber means,
said first seal means being responsive to the difference in pressure forces of the fluid in said storage chamber means and fluid pressure forces at said seal outside the storage chamber means to pass the fluid outside the first seal means to the storage chamber means when the fluid pressure outside the storage means is greater than the pressure in the storage chamber means and to essentially prohibit passage of fluid from the storage chamber means to the point outside the first seal means when the pressure in the storage chamber means is in excess of the pressure at the point outside the first seal means and thus maintain the magnitude of the pressure in the storage chamber means essentially the same as was the pressure outside the first seal means.

16. The plural seal arrangement of claim 15, wherein the first seal mans is an O-ring deformable seal.

17. The plural seal arrangement of claim 16, wherein both seal means are O-ring seals.

18. The plural seal arrangement of claim 15 wherein said first seal means is seated on an inclined channel having a passageway means therein for passing the fluid outside the first seal means to the storage chamber means.

19. The plural seal arrangement of claim 18, wherein the inclined channel is a V-shaped channel defined by two inclined ramps acutely angled to each other and the passageway is located in one of said inclined ramps which is located further away from the said first seal means than the other ramp.

20. The plural seal arrangement of claim 15, wherein there is an auxiliary storage means adjacent the first seal means which auxiliary storage means is connected to the storage chamber means.

21. The plural seal arrangement of claim 20, wherein the auxiliary chamber is defined by a plurality of walls and wherein the area of the auxiliary chamber means is increased by deformation of at least one of said walls.

* * * * *